Patented May 12, 1931

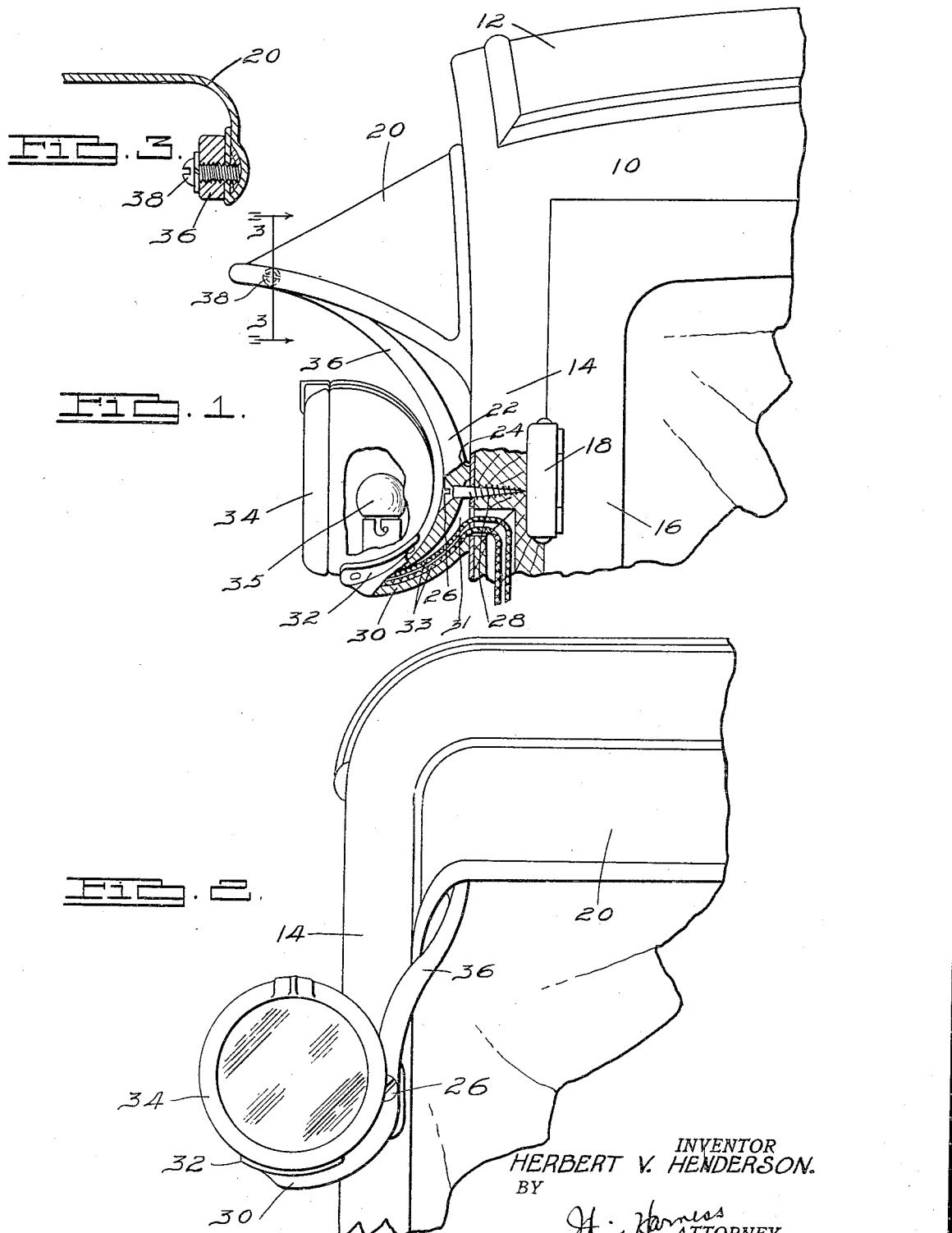

1,805,364

UNITED STATES PATENT OFFICE

HERBERT V. HENDERSON, OF DETROIT, MICHIGAN, ASSIGNOR TO CHRYSLER CORPORATION, OF DETROIT, MICHIGAN, A CORPORATION OF DELAWARE

SUPPORTING BRACKET

Application filed September 16, 1929. Serial No. 392,091.

This invention relates to a bracket and more particularly to a lamp bracket designed in such a manner to support a portion of a vehicle body, such as a visor, as well as a lamp.

An object of the invention is to provide a single bracket having a single attaching portion for securing the bracket to a support and a pair of oppositely extending portions each adapted to be secured to a part to be supported.

Other objects and advantages of the invention will more fully appear from the following description taken in connection with the accompanying drawings, in which:

Fig. 1 is a side view of the upper forward portion of a vehicle body showing one adaptation of my improved bracket, parts being broken away and in section.

Fig. 2 is a front elevation of Fig. 1.

Fig. 3 is a sectional view on line 3—3 of Fig. 1.

Referring now to the drawings, the reference numeral 10 designates a portion of the vehicle body having a top 12, pillar 14 and door 16 hinged to the pillar, as at 18. At the upper portion of the pillar and across the front of the body I have provided a sun visor 20.

Secured on the forward side of the pillar 14 I have provided a bracket 22 having a flat face portion 24 and an opening 26 to receive a screw 28. The flat face portion 24 of the bracket is formed in the body portion thereof and rests against the forward face of the pillar 14. An arm 30 extending downwardly and outwardly from the body portion is provided with a spherical face portion 32 adapted to receive a part to be supported, such as a lamp 34. The arm 30 and a portion of the body portion is provided with a central opening 31 extending from the flat face portion 24 to the spherical face portion 32 to receive electrical connections 33 connected to the lamp 34 and supply electrical energy to a bulb 35.

An upwardly extending arm 36 is provided on the body portion and is curved forwardly, extending beyond the forward face of the lamp 34. The arm 36 is also curved inwardly to be received on the inner surface of the visor 20 and is secured thereto by a screw 38. When the bracket is viewed in side elevation, the forward edge of the arm 30, the forward edge of the body portion and the forward edge of the arm 36 present a parabolical curve, the lower portion of which receives the lamp 34.

Referring to Fig. 2, it will be noted that the arm 36 is curved inwardly from the pillar to be received on the inner face of the visor and that the arm 30 is curved outwardly to position the lamp beyond the plane of the pillar 14.

It will be understood that a simple, inexpensive bracket has been provided, which not only supports the lamp but supports the visor, both of which are supported from a single point. The bracket 22 and lamp 34 may be assembled on the visor 20 and the entire assembly secured to the forward face of the vehicle body as a unit.

It will be understood that various changes, including the size, shape and arrangement of parts, may be made without departing from the spirit of my invention and it is not my intention to limit its scope other than by the terms of the appended claims.

What I claim is:

1. A device of the class described comprising in combination, a vehicle body, a visor on said body, a bracket between said body and said visor, and a lamp on said bracket.

2. A device of the class described comprising in combination, a vehicle body, a visor on said body, a bracket secured to said body, an upwardly extending arm on said bracket secured to said visor, a downwardly extending arm on said bracket, and a lamp on said downwardly extending arm.

3. A device of the class described comprising in combination, a vehicle body having a front pillar, a visor at the upper forward face of said body pillar, a bracket on the forward face of said pillar and below said visor, an upwardly and forwardly extending arm on said bracket having its outer end secured to said visor, a downwardly and forwardly extending arm on said bracket, and a lamp on said last named arm.

4. A bracket of the class described comprising a body portion, an upwardly, inwardly, and forwardly extending arm on said body portion, a downwardly and forwardly extending arm on said body portion, and a curved plate on the outer end of said last named arm.

5. A bracket of the class described comprising a body portion, an upwardly and forwardly extending arm on said body portion, a downwardly and forwardly extending arm on said body portion, and a curved plate on the outer end of said last named arm, said upwardly extending arm projecting beyond the curved plate portion on said downwardly extending arm.

6. A bracket of the class described comprising a body portion having a securing face surface, an upwardly and forwardly extending arm on said body portion opposite the securing face surface, a downwardly and forwardly extending arm on said body portion opposite the securing face surface, and a face portion on said downwardly extending arm, said body portion and said downwardly extending arm having an opening extending from the securing face surface through the downwardly extending arm and the face portion of said arm.

7. A device of the class described comprising in combination, a vehicle body having a front pillar, a visor at the upper forward face of said body pillar, a bracket on the forward face of said pillar and below said visor, an upwardly and forwardly extending arm on said bracket having its outer end secured to said visor, a downwardly and forwardly extending arm on said bracket having an opening therein through out its length, a curved plate conforming to the curved surface of a lamp on the outer end of said downwardly extending arm, and a lamp on said curved plate.

HERBERT V. HENDERSON.